US008051079B2

(12) United States Patent
Cheng et al.

(10) Patent No.: US 8,051,079 B2
(45) Date of Patent: Nov. 1, 2011

(54) WISH LISTS BASED ON IMAGES, REFERENCES, OR THIRD PARTY BENEFICIARIES

(75) Inventors: Lili Cheng, Bellevue, WA (US);
Michael Connolly, Seattle, WA (US);
Gary W. Flake, Bellevue, WA (US);
Alexander G. Gounares, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 11/960,098

(22) Filed: Dec. 19, 2007

(65) Prior Publication Data
US 2008/0154898 A1 Jun. 26, 2008

Related U.S. Application Data

(60) Provisional application No. 60/870,926, filed on Dec. 20, 2006.

(51) Int. Cl.
*G06F 17/30* (2006.01)
(52) U.S. Cl. .......... 707/733; 707/708; 707/734; 725/46; 705/26
(58) Field of Classification Search .................... 707/708
See application file for complete search history.

(56) References Cited

U.S. PATENT DOCUMENTS

| 6,578,017 | B1 * | 6/2003 | Ebersole et al. ................... 706/3 |
| 6,611,814 | B1 * | 8/2003 | Lee et al. ..................... 705/7.29 |
| 6,865,546 | B1 * | 3/2005 | Song .............................. 705/26 |
| 7,836,095 | B2 * | 11/2010 | Adwankar et al. ............ 707/803 |
| 2002/0120864 | A1 * | 8/2002 | Wu et al. ....................... 713/201 |
| 2003/0018745 | A1 * | 1/2003 | McGowan et al. ........... 709/217 |
| 2003/0110503 | A1 * | 6/2003 | Perkes ............................. 725/86 |
| 2006/0095331 | A1 * | 5/2006 | O'Malley et al. ................ 705/22 |
| 2006/0095516 | A1 * | 5/2006 | Wijeratne ..................... 709/205 |
| 2006/0129551 | A1 * | 6/2006 | Teicher ............................ 707/5 |
| 2006/0161484 | A1 * | 7/2006 | Pandhe ........................... 705/27 |
| 2008/0115168 | A1 * | 5/2008 | Adwankar et al. .............. 725/46 |

* cited by examiner

*Primary Examiner* — Frantz Coby
(74) *Attorney, Agent, or Firm* — Shook, Hardy & Bacon L.L.P.

(57) ABSTRACT

The claimed subject matter relates to an architecture that can create a wish list based upon a variety of inputs and criteria. In one aspect the architecture can generate a wish list based upon one or more images of an item desired by a user. Accordingly, the architecture can examine the image to identify the desired item and to extract relevant features from the item in order to, e.g., match the imaged item to a catalog item for sale by a vendor. In another aspect, the architecture can access information associated with a third party to build a wish list for a user. Appreciably, according to the particular aspect, the wish list can include items that are designated to a particular beneficiary.

15 Claims, 14 Drawing Sheets

WISH LISTS BASED ON IMAGES, REFERENCES, OR THIRD PARTY BENEFICIARIES

CROSS-REFERENCE TO RELATED APPLICATIONS

This application claims the benefit of U.S. Provisional Application Ser. No. 60/870,926, filed Dec. 20, 2006, entitled "ARCHITECTURES FOR SEARCH AND ADVERTISING," the disclosure of which is hereby incorporated herein in its entirety by reference.

BACKGROUND

Wish lists are widely successful mechanisms to promote sales as well as to provide a way to personalize or tailor gifts by allowing the recipient or beneficiary a means of publishing his or her desires. However, there are many limitations in conventional wish list mechanisms. One such limitation is the potential for misunderstanding due to unfamiliarity with a product or product domain. This misunderstanding can arise when the wish list is populated or when the wish list is employed by a gift-giver. For example, unless the creator of a wish list is technically familiar with the items entered, it can be difficult to know precisely what is desired. In addition, if the purchaser is not familiar with the item domain, then similar mistakes can arise.

Conventionally, populating a wish list is a matter of allocating time to sit down and think about what items would be desirable, possibly in connection with browsing a catalog. Yet, ideas for a wish list are often a result of an observation or some other experience, usually at random or at least relatively unpredictable times. Unfortunately, these ideas are often quickly forgotten afterward. Moreover, even when appropriate time is allocated to generating a wish list, such a list is often based upon only a single vendor such as the vendor who maintains the wish list or provides the catalog. Such a vendor may not be the item actually desired or may not be the least expensive. Furthermore other vendors might carry substantially similar items with better features or a lower price.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can generate a wish list based upon one or more images. To these and other related ends, the architecture can receive one or more images of an item desired by a user, and can further add that item to a wish list. Appreciably, the images can be received from a camera or cell phone such that the images can be generated at virtually any time, even while engaged in disparate activities. Moreover, given that purchasing ideas are often the result of first-hand observation rather than dedicated brainstorming, these images can serve as a record of a purchasing idea, conveniently recorded at the time of observation rather than later on, which invites the risk of forgetfulness.

In particular, the architecture can examine the image to identify the object or element that constitutes the desired item, extract discernible features from the identified object (e.g., model, brand, style . . . ) and can match the imaged item to a catalog item for sale by one or more vendors. The architecture can further populate the wish list with the catalog item, potentially selecting from multiple vendors to locate the least expensive item, most similar item to the image, or a variety of other criteria that can be configured by the user.

In another aspect of the claimed subject matter, an architecture can be provided that can access information associated with a third party for creating a wish list. In this case, the architecture can request and/or receive certain profile information from one party in order to build a wish list for another party. For example, a first party can look to a second party's wish list or the second party's purchase history to gather ideas for her own wish list. Such can be especially useful when limited to a certain domain. For instance, a user might value book recommendations from a second user, but not the wine recommendations of the second user. Hence, the architecture can populate the first user's wish list with data from the second user only in the domain of books.

It should be appreciated that various forms of security or authentication can be provided to ensure that the accessing party has rights to the accessed party's data. In one aspect the authentication can arise based upon an association rather than manual assignment of permissions such as when the accessed party adds the accessing party to a friend list.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
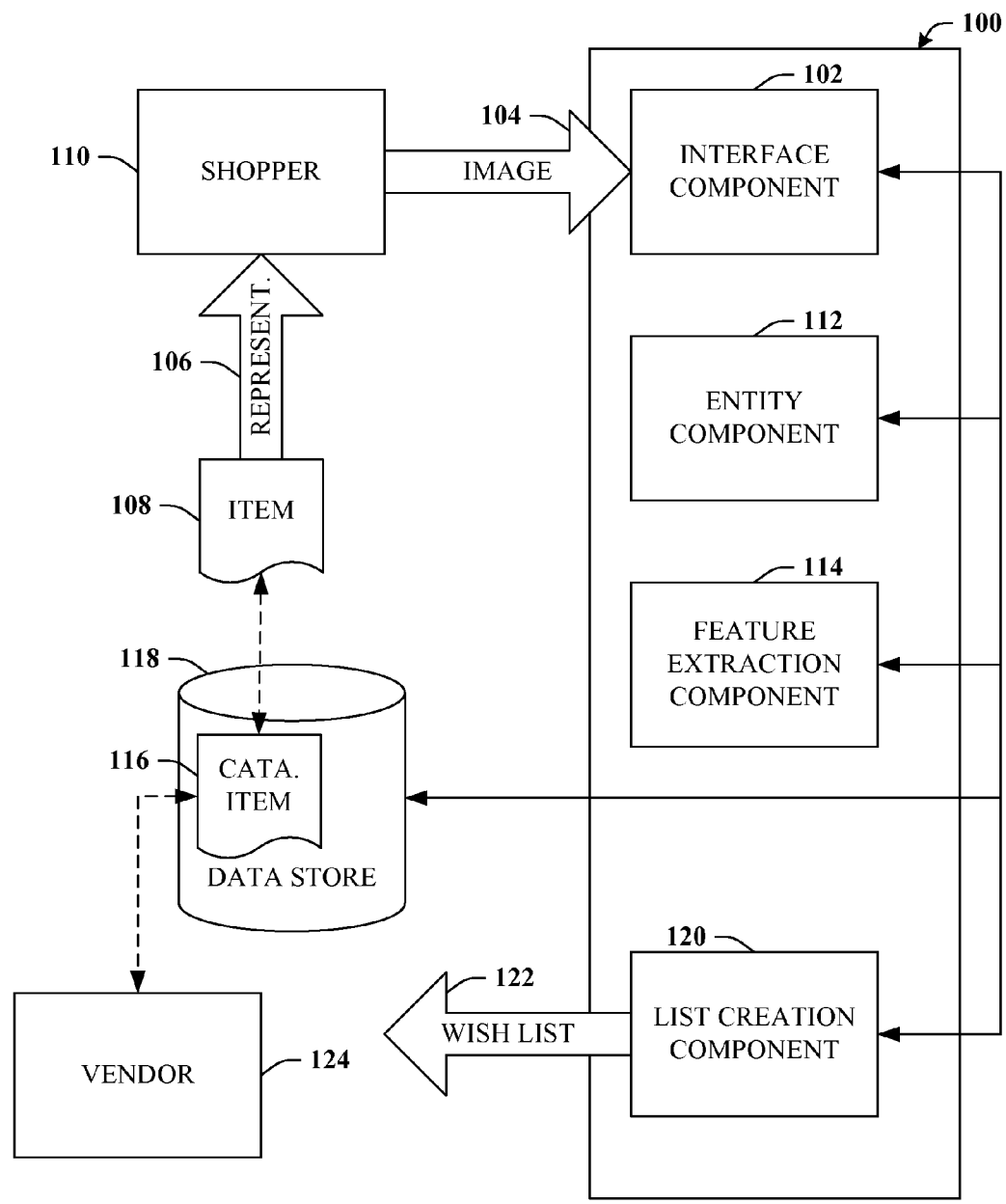
FIG. 1 illustrates a block diagram of a system that can generate a wish list for a shopper based upon one or more images.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, system 100 that can generate a wish list for a shopper based upon one or more images is depicted. Generally, system 100 can include interface component 102 that can receive image 104, wherein image 104 can include representation 106 of item 108 desired by shopper 110. In particular, representation 106 can be a digital or photographic representation of item 108 that shopper 110 would like to own, purchase, and/or receive as a gift. Item 108 can be substantially any product or service that can in some way be represented by image 104. It should be appreciated that shopper 110 can be substantially any individual or entity that uses the subject matter described or claimed herein such as one who compiles a list of products or services intended for purchase. According to some aspects, shopper 110 can be one who maintains an account with associations (e.g., friend lists) and/or utilizes the account or a social network in connection with purchase-based transaction such as purchases or wish lists. Hence, shopper 110 need not make a purchase or even intend immediately to make a purchase, and need not be actively "shopping."

In accordance with the foregoing, shopper 110 can identify and/or record desired items (e.g., item 108) in a spontaneous manner or without allocating time for such a task specifically. For example, rather than spending time browsing a vendor catalog in search of some specific item or a more general search to find items that are desired, shopper 110 can instead make note of item 108 during other activities and, e.g. snap a picture (e.g. image 104) of item 108. For instance, shopper 110 can be strolling in a park and notice another park-goer who is wearing really cool sandals or exercising his dog with an interesting Frisbee-like toy. Conventionally, shopper 110 would need to commit features of the sandals or the toy to memory until some later time. Unfortunately, when shopper 110 does sit down to compile a shopping list or gift list, or is actively shopping at a location where such might be purchased, it is common that shopper 110 will have forgotten about the sandals or the toy. Furthermore, even if not entirely forgotten, shopper 110 might be unfamiliar with item 108, and therefore be unable to recall or describe certain distinguishing features. Still further, there can be the case in which shopper 110 identifies a desirable item 108 because it "looks cool," even without performing a cognitive association as to why item 108 is "cool" or what features make it so. In such a case, later shopping or browsing for the item can be difficult or frustrating as shopper 110 often consciously associates item 108 rather than particular features of item 108 with qualities of desirability.

In order to mitigate these and other difficulties, shopper 110 can acquire a photographic representation 106 of item 108, e.g., included in image 104, and thus conveniently record purchasing ideas without time-consuming browsing of catalogs or the like and further without being confined to a single vendor's catalog, which may not carry a sufficiently similar item 108 or may be more expensive. It should be appreciated that image 104, which can include representation 106, can be acquired by any suitable means, such as by way of a digital camera, a cellular phone or other mobile device with imaging components, a video camera, a scanner, digital media or other machine or computer-readable media and so on. Moreover, it should be understood that multiple images 104 can be provided, e.g. where each image 104 includes representation 106 from a different angle, perspective, range, etc.

System 100 can also include entity component 112 that can identify representation 106. In the trivial case, image 104 can include little or nothing more than representation 106 such that identifying representation 106 is quite simple. However, in other cases, for example, when image 104 includes many elements, it may not always be clear which object (e.g., representation 106) within image 104 that shopper 110 finds desirable. For instance, consider shopper 110 who is in a crowded shopping mall when she notices another patron wearing a really great pair of jeans. Shopper 110 immediately snaps a picture of the patron with her cell phone, yet the resultant image 104 can include several other shoppers as well as objects or elements in the background, which can require a determination or filtering process. Moreover, even if it is clear (e.g., high level of confidence) what is the intended target, it must still be determined or inferred what portion or aspect of the target is the intended representation 106. In particular, entity component 112 can identify the jeans as representation 106 rather than, say a hat worn by the same party, which is further detailed in connection with FIG. 2 infra.

Upon identification of representation 106 (e.g. the jeans worn by the targeted individual included in image 104), feature extraction component 114 can extract features discernible in representation 106 in order to match representation 106 to catalog item 116 that can be for sale by vendor 124. For example, feature extraction component 114 can identify virtually any suitable feature or characteristic of item 108. While it is readily understood that what is described herein is not limited merely to jeans, for the sake of a concrete illustration, feature extraction component 114 can, e.g., identify the brand, cut, fit, color, or style as well as more specific aspects such as pleats, pockets, buttons, patterns, designs, and in some cases material or characteristics of such.

Based upon object recognition techniques and other suitable recognition techniques such as product recognition, facial recognition (e.g., to identify, say, friends of shopper 110), character recognition (OCR) (e.g., to identify brand, make, model or other relevant identifiers), or the like, any of which can be well-known or later discovered, feature extraction component 114 can determine a broad item class. Hence, continuing the example case, entity component 112 can identify the suitable representation 106 (e.g., the jeans from among other object in image 104), and feature extraction component 114 can extract this representation 106, employ recognition techniques to determine that representation 106 is broadly categorized as blue jeans. In addition, features extraction component 114 can, further examine features of the depicted blue jeans discernible in representation 106 to e.g., identify a UPC (Universal Product Code) or one or more relevant SKU (Stock Keeping Unit) numbers in connection with catalog item 116. Once representation 106 has been matched to a suitable catalog item 116, feature extraction component 114 can extract additional information such as item descriptors, feature identifiers, and so forth to obtain additional information about item 108.

It should be appreciated that catalog item 116 can exist in data store 118 that is intended to represent a store of all data described herein or otherwise useful for later access or recall. Data store 118 is not necessarily intended to be a single physical or logical storage unit and need not be centralized to any specific degree. Rather, data store 118 can be distributed such that all or portions of data therein can reside at distinct locations and all or portions of data therein can be stored by way of distinct schema. Moreover, access to all or portions of data within data store 118 can be regulated by way of credentials, permissions, or another type of security protocol, and certain data may only be available to particular participants or only based upon certain conditions. For instance, data store 118 can include a vendor catalog, which can physically reside on a server maintained by vendor 124 that is publicly available; as well as a profile associated with shopper 110 that resides on a device associated with shopper 110 and/or is stored centrally and securely such that only shopper 110 or other authorized parties can access such data.

In addition, system 100 can also include list creation component 120 that can populate wish list 122 with catalog item 116. Accordingly, shopper 110 can photograph a pair of jeans and subsequently receive a shopping list (e.g., wish list 122) that includes an entry reciting, "low-cut, European-panel, wide-leg denim," even though shopper 110 only consciously noticed that the jeans she saw looked cool and did not notice or know enough about that particular product to know that categories exist for jeans that are "low-cut," "wide-leg," or any other pertinent feature. It should be understood that wish list 122 can be published to others, can be public or private, can be a personal shopping list for shopper 110 alone, or can be designated for a third party (e.g., a gift list), as described in more detail with reference to FIGS. 3 and 5.

Figure 2:
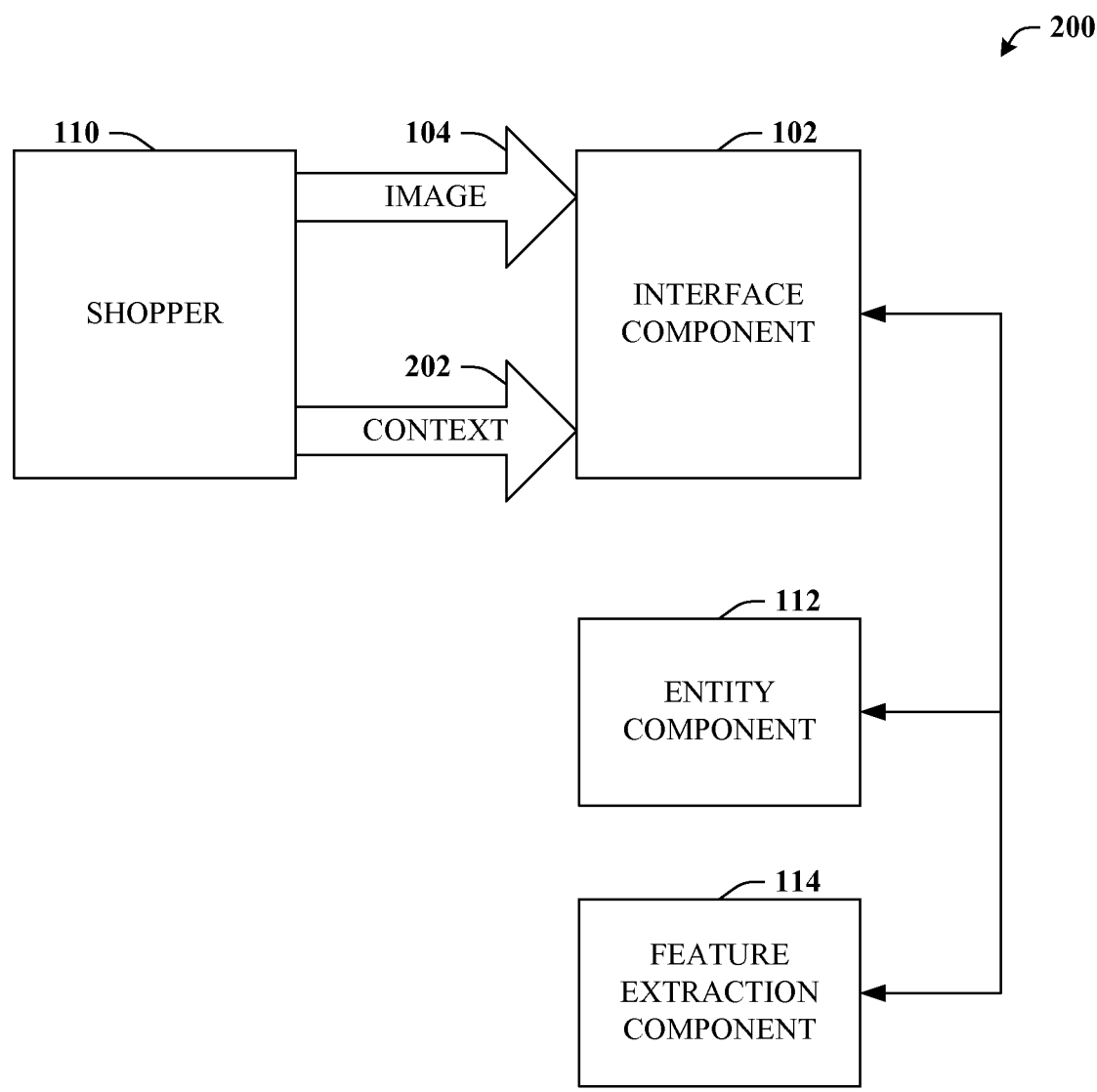
FIG. 2 illustrates a block diagram of a system that can employ contextual content to aid in creation of the wish list.

Turning now to FIG. 2, system 200 that can employ contextual content to aid in creation of the wish list is illustrated. In general, system 200 can include interface component 102 that can receive image 104; entity component 112 that can identify representation 106 included in image 104; and feature extraction component 114 that can match representation 106 to catalog item 116 as substantially described supra. While not expressly depicted, it should be appreciated that system 200 can also include list creation component 120.

In particular, interface component 102, in addition to receiving image 104, can also receive contextual input 202 from shopper 110. Contextual input can be, e.g., a text-based input intended to provide addition context. According to an aspect of the claimed subject matter, contextual input 202 can be utilized by entity component 112 to identify representation 106 included in image 104. For example, returning to the above example in which shopper 110 photographs a pair of jeans worn by an individual in a crowded environment, contextual input 202 can aid entity component 112 in identifying representation 106. Thus, in addition to image 104, shopper 110 can also provide text (e.g., contextual input 202) such as "jeans" to help entity component 112 distinguish representation 106 from one or more other objects or representations include in image 104.

As another example, while item 108 has been thus far described in terms of products, it should be appreciated that item 108 can also be a service. Thus, shopper 110 can image a tanning salon (or sign, advertisement, or banner thereof) or photograph a hair stylist in the act of servicing a customer to indicate that hair care services are desired. Thus, contextual input 202 can aid entity component 112 in identifying representation 106 or aid feature extraction component 114 in matching representation 106 to service-based catalog item 116 by indicating desired item 108 is a service. For example, contextual input 202 can read, e.g., "tanning," "service," "service—tanning," or the like.

Figure 3:
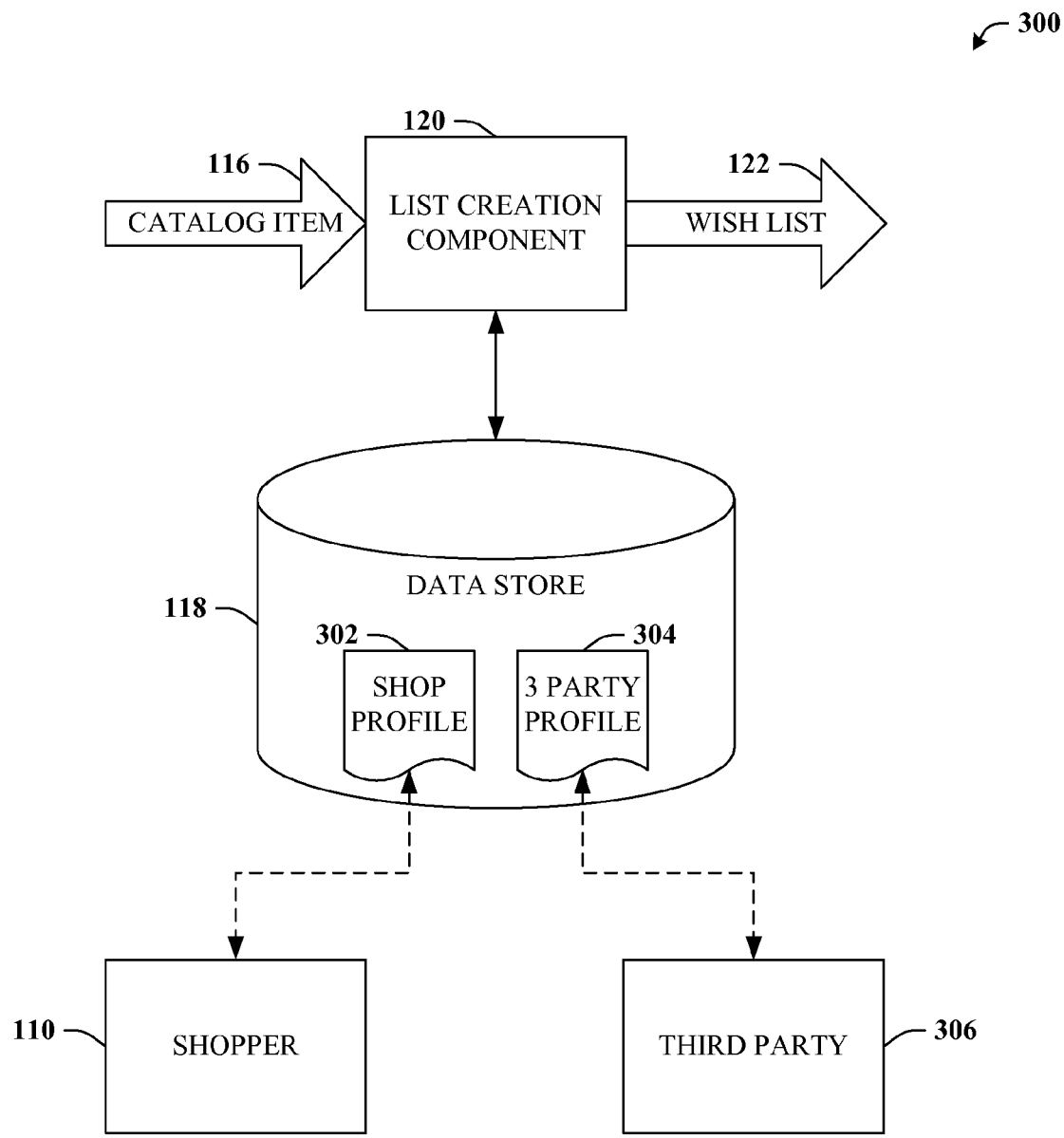
FIG. 3 depicts a block diagram of a system that can tailor a catalog item to a particular individual.

Referring now to FIG. 3, system 300 that can tailor a catalog item to a particular individual is provided. System 300 can include list creation component 120 that can populate wish list 122 with catalog item 116 as substantially described supra. In addition to populating wish list 122 with a generic or more general catalog item 116, list creation component 120 can tailor catalog item 116 to a particular individual. In particular, list creation component 120 can access a profile, which can be included in data store 118, in order to further tailor catalog item 116.

For example, catalog item 116 can be very specific as to make, model, style, options, features and the like (e.g., determined or identified by feature extraction component 114), whereas characteristics such as size, preferences, or other personalizable traits of catalog item 116 are frequently determined at a point-of-sale. However, list creation component 120 can automate portions of this process. Returning once more to the blue jeans example, feature extraction component 114 can match the blue jeans depicted in image 104 to one or more catalog items 116 of one or more vendors 124. Thus, the exact brand, style, fit, and so forth can be determined and ready to be entered to wish list 122. Next, list creation component 120 can access profile 302 associated with shopper 110 to, e.g., retrieve a size for the jeans, to further refine or tailor the entry made to wish list 122. It should be underscored that shopper 110 can create a gift list for a third party beneficiary as well as creating a list for his or her own sake. Hence, additionally or alternatively, list creation component 120 can access profile 304 associated with third party 306 (e.g., a beneficiary of the jeans and/or a friend of shopper 110) in order to retrieve a blue jean size of third party 306. Accordingly, wish list 122 can be populated not only with standard accounting or stock keeping data, but can also be personalized to a particular individual. Of course it should be appreciated that tailoring the size of a blue jean catalog item 116 is merely exemplary and is not necessarily intended to limit the scope of the claimed subject matter to only this example, as one of ordinary skill can readily appreciate a multitude of additional aspects that are possible.

According to an aspect of the claimed subject matter, list creation component 120 can also examine wish list 122 in order to suggest additional catalog items to add. Additional catalog items suggested can be based entirely upon entries included in wish list 122 or based upon additional information such as that obtained from one or more profiles 302, 304 or other data resident in data store 118. For example, if wish list 122 includes a dress shirt and dress pants, list creation component 120 can suggest a tie, perhaps previously matched to the shirt and pants by one or more vendors 124. As an example of utilizing profile information to provide the suggestion, if shopper 110 includes a digital camera on wish list 122 and it can be determined or inferred (e.g., from profile 302) that shopper 110 is an avid naturalist, list creation component 120 can suggest, e.g., a telephoto lens, given that, say, a transaction history included in profile 302 does not list a previous purchase of a telephoto lens or one that is compatible with the digital camera included in list 122.

Figure 4:
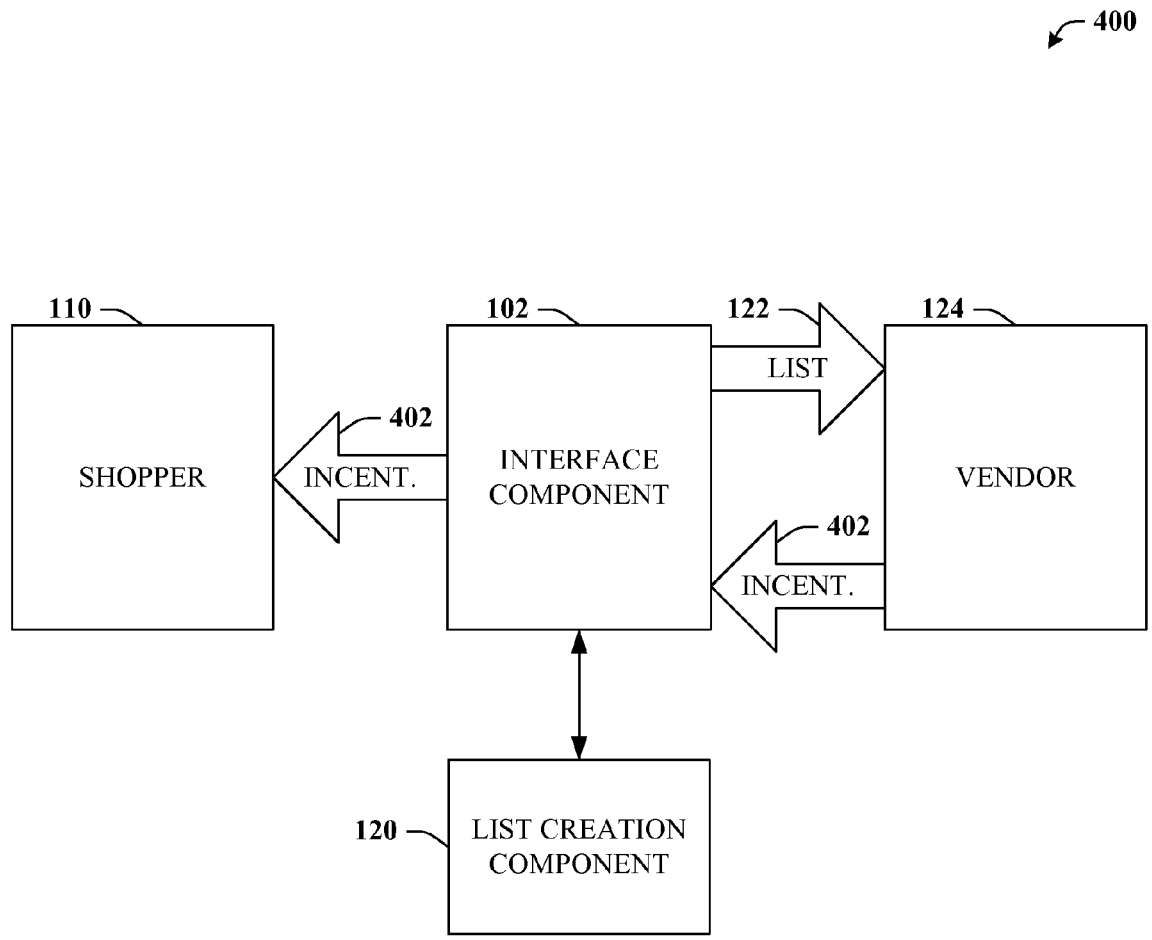
FIG. 4 illustrates a block diagram of a system that can facilitate communication between shoppers and vendors.

With reference now to FIG. 4, system 400 that can facilitate communication between shoppers and vendors is depicted. Generally, system 400 can include interface component 102 that can receive image 104 and contextual input 202 from shopper 110; and list creation component 120 that can populate wish list 122 with catalog items 116 for sale by one or more vendors 124. Additionally, interface component 102 can transmit all or portions of wish list 122 to vendor 124. This transmission can include a request to provide incentive 402, such as a coupon, discount, promotion, or the like. In response, interface component 102 can receive incentive 402 from one or more vendors 124, which can be relayed to shopper 110.

It should be appreciated that interface 102 can submit all or portions of list 122 to multiple vendors and pass on all or a subset of received incentives 402 to shopper 110. For example, interface component 102 can relay only the most cost-effective incentive 402 or only the optimal incentive 402 in terms of price with respect to similarity between catalog item 118 and representation 106. Furthermore, list creation component 120 can designate which vendors 124 can receive the transmitted wish list 122, such as only vendors that meet some predetermined threshold in terms of price, quality, customer satisfaction, similarity of catalog item 116, and so forth.

Figure 5:
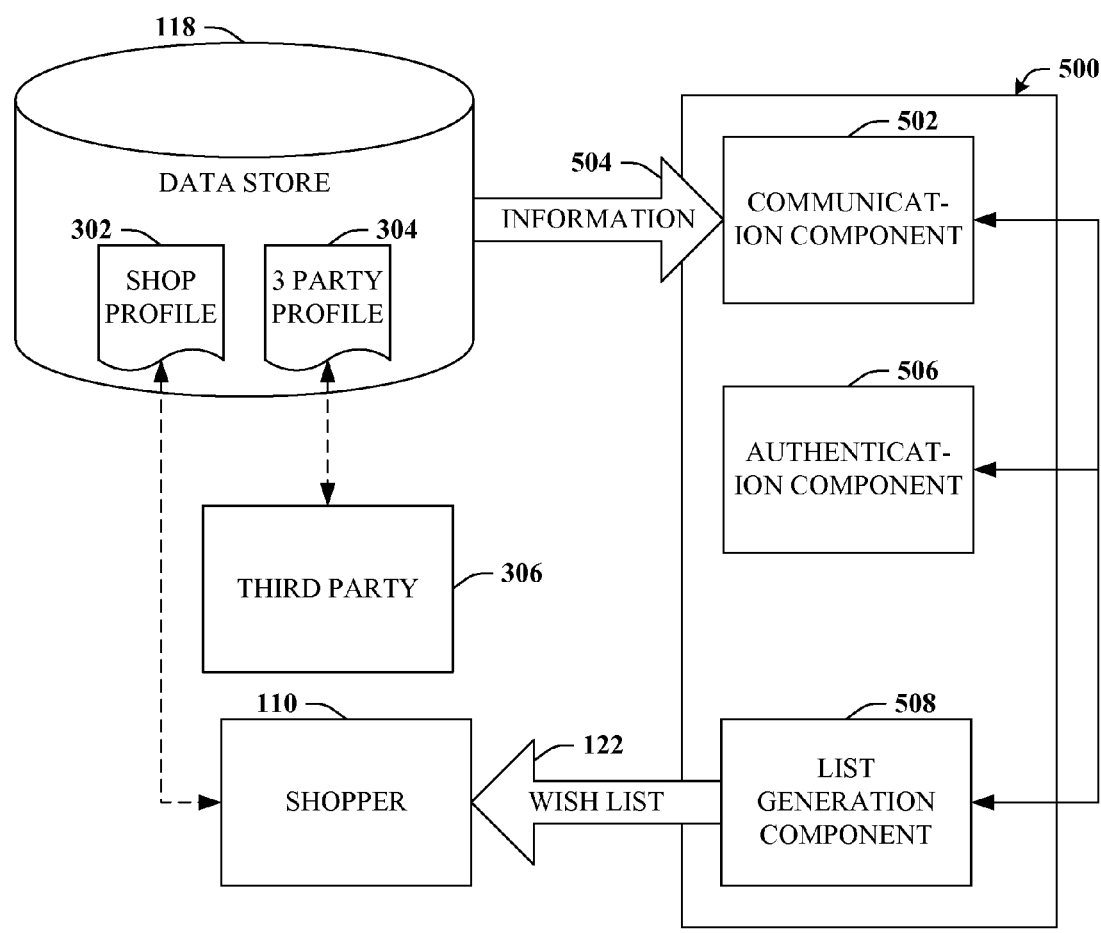
FIG. 5 depicts a block diagram of a system that can access information associated with a third party to create a wish list for a shopper.

Turning to FIG. 5, system 500 that can access information associated with a third party to create a wish list for a shopper is illustrated. It should be appreciated that it is conceivable that system 500 can employ aspects or features described in connection with FIGS. 1-4, just as it is also conceivable that system 100 can employ aspects or features described by FIGS. 5 and 6 and the accompanying text. In some cases systems 100 and 500 can be partially or entirely independent. Typically, system 500 can include communications component 502 that can request and/or receive information 504 that relates to a third party (e.g., third party 306) such as a friend or colleague of shopper 110. Information 504 can be retrieved from data store 118 and can reside in a profile associated with third party 306 such as third party profile 304.

System 500 can also include authentication component 506 that can verify shopper 110 is authorized to request or receive information 502. In particular, data included in third party profile 304 can be deemed private information for which third party 306 might not wish to share. Accordingly, third party 306 can designate all or portions of data included in third party profile 304 as public or private as well as set access rights such that only those with suitable permissions, associations, or credentials can access particular portions.

Furthermore, system 500 can include list generation component 508 that can populate wish list 122. Appreciably, wish list 122 can be intended as a purchase list for shopper 110, third party 306, or another entity or individual and the intended beneficiary of catalog items 116 on wish list 122 can be any of shopper 110, third party 306, or another entity or individual. However, in some cases wish list 122 can be generated for only a single party and the intended beneficiary can be only a single party of those listed above as well. Regardless, it should be appreciated that list generation component 508 can populate wish list 122 based upon information 504, as further described in connection with FIG. 6 infra.

Figure 6:
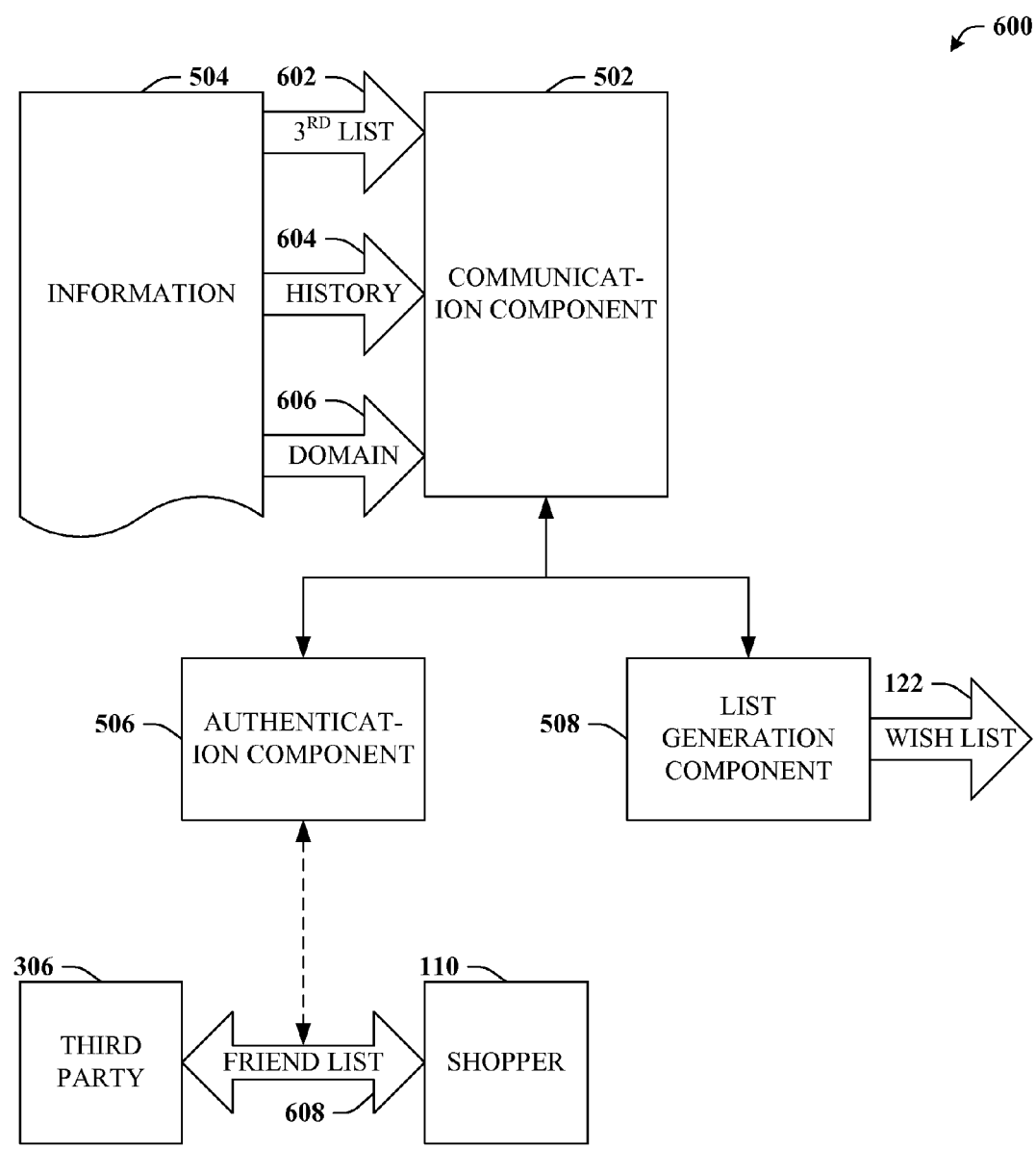
FIG. 6 is a block diagram of a system that can utilize information associated with a third party to generate a wish list for a shopper.

Referring now to FIG. 6, system 600 that can utilize information associated with a third party to generate a wish list for a shopper is illustrated. As detailed herein, communication component 502 can request and/or receive information 504 that relates to third party 306. Information 504 can be, e.g. all or portions of a third party wish list 602. In such a case, list generation component 508 can populate wish list 122 with one or more items existing in third party wish list 602. In other words, wish list 122 can copy or mirror third party wish list 602 such that shopper 110 can receive a wish list 122 that includes items compiled by third party 306.

For example, consider two friends, Ashley and Ross, who are both new age rock enthusiasts. Ross is continually impressed with Ashley's ability to remain on the cutting edge of this type of music and who always seems to select the best of the genre. Accordingly, Ross can set his wish list 122 to automatically be populated with items from Ashley's wish list (e.g. third party wish list 602) such that when he (or another for whom Ross is a beneficiary) intends to make a purchase, his list can reflect Ashley's input or character as well as his own.

According to another aspect, information 504 can be a portion of third party transaction history 604. For instance, in addition to storing wish lists, third party profile 304 (or another relevant portion of data store 118) can also include items that were actually purchased. Thus, list generation component 508 can populate wish list 122 with an item previously purchased by third party 306. For example, it might be that Ashley adds a large amount of music to third party wish list 602 (e.g., her own personal wish list), but generally only purchases a very small subset of those items, which is the subset Ross typically finds to be quite in accord with his own tastes. Thus, Ross can indicate that his wish list 122 should only be populated with items that Ashley actually buys. It should be appreciated that Ashley's transaction history (e.g., third party transaction history 604) can include only those items she buys for herself, therefore excluding, e.g. items she purchases for another (e.g., a third party beneficiary) or items that others purchase for her (e.g., friends who access her wish list to buy her a gift).

In yet another aspect, information 504 can be specific to a particular domain 606 of items such that list generation component 508 populates wish list 122 only with items from the specific domain 606. Hence, while Ross greatly appreciates Ashley's taste in music, her taste in clothes would not be similarly suitable for Ross. Thus, Ross can select that Ashley's wish list (third party wish list 602) or Ashley's transaction history (third party transaction history 604) should be employed to populate his own wish list 122, but only for items in the domain of music. However, it should be appreciated that, while Ross can create wish list 122 specifically for himself, he might also desire to create a wish list for others (e.g., a wish list for a third party beneficiary). To continue this example, suppose Ross decides to create wish list 122 for his fiancée, Erin. In such a case Ashley's input and/or transactions with respect to clothes might be suitable for Erin even though not particularly suitable for Ross himself. Accordingly, Ross can select that Ashley's wish lists or transaction histories be employed for, say, the domain of clothes, when populating a wish list for Erin as the beneficiary.

It should be understood that Ross's ability to request or receive personal information relating to Ashley can be verified by authentication component 506. According to an aspect, authentication component 506 can verify shopper 110 (e.g., Ross) is authorized to access or receive third party 306 information 504 (e.g., information associated with Ashley) based upon access rights that are granted when third party 306 adds shopper 110 to friend list 608. In other words, when Ashley adds Ross to her friend list 608, such an action can entitle Ross to access designated personal data such as profile data, e.g. wish lists, purchase histories and so on. Of course not all information 504 need be accessible and certain portions can be configured independently.

Figure 7:
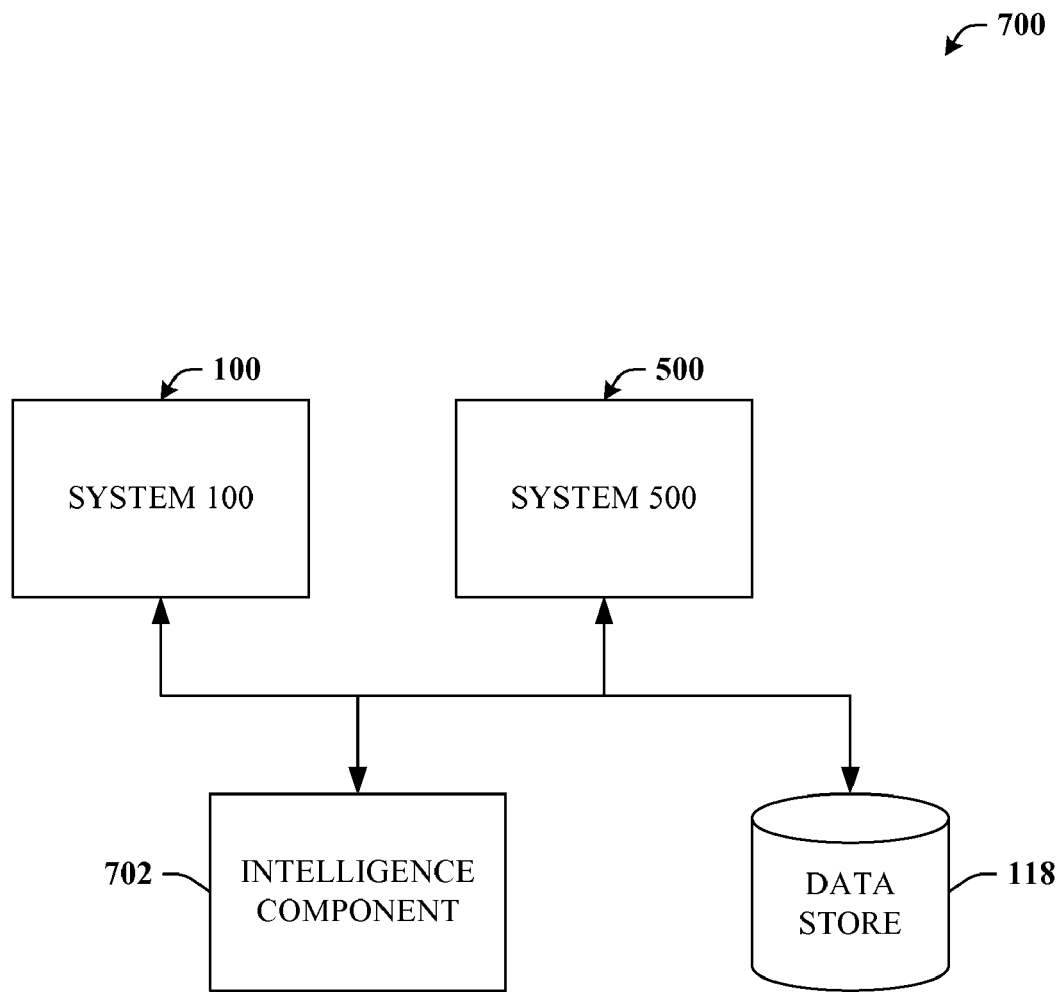
FIG. 7 depicts a block diagram of a system that can aid with various inferences.

Turning now to FIG. 7, system 700 that can aid with various determinations or inferences is depicted. Typically, system 700 can include all or portions for system 100, particularly, entity component 112, feature extraction component 114, and list creation component 120. Likewise, system 700 can include all or portions of system 500 such as list generation component 508. For example, entity component 112 can, inter alia, intelligently identify representation 106, such as by employing prominence, focus/zoom, size, other recently received images 104, or position of representation 106 within image 104, all of which can possibly be utilized in connection with contextual input 202.

On the other hand, feature extraction component 114 can, e.g., intelligently employ confidence metrics in connection with recognition techniques in order to facilitate matching representation 106 to catalog item 116. Similarly, list creation component 120 and/or list generation component 508 can intelligently suggest additional items for wish list 122 as well as intelligently determine which vendors to submit wish list 122 and/or which incentives 402 to supply to shopper 110; or when determining whether or not a particular item should be included in domain 606 criteria.

In addition, system 700 can also include intelligence component 702 that can provide for or aid in various inferences or determinations. It is to be appreciated that intelligence component 702 can be operatively coupled to all or some of the aforementioned components. Additionally or alternatively, all or portions of intelligence component 702 can be included in one or more of the components 112, 114, 120, or 508. Moreover, intelligence component 702 will typically have access to all or portions of data sets described herein or otherwise suitable to the claimed subject matter, such as data store 118, and can furthermore utilize previously intelligently determined or inferred data.

Accordingly, in order to provide for or aid in the numerous inferences described herein, intelligence component 702 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIGS. 8, 9, 10, 11, and 12 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
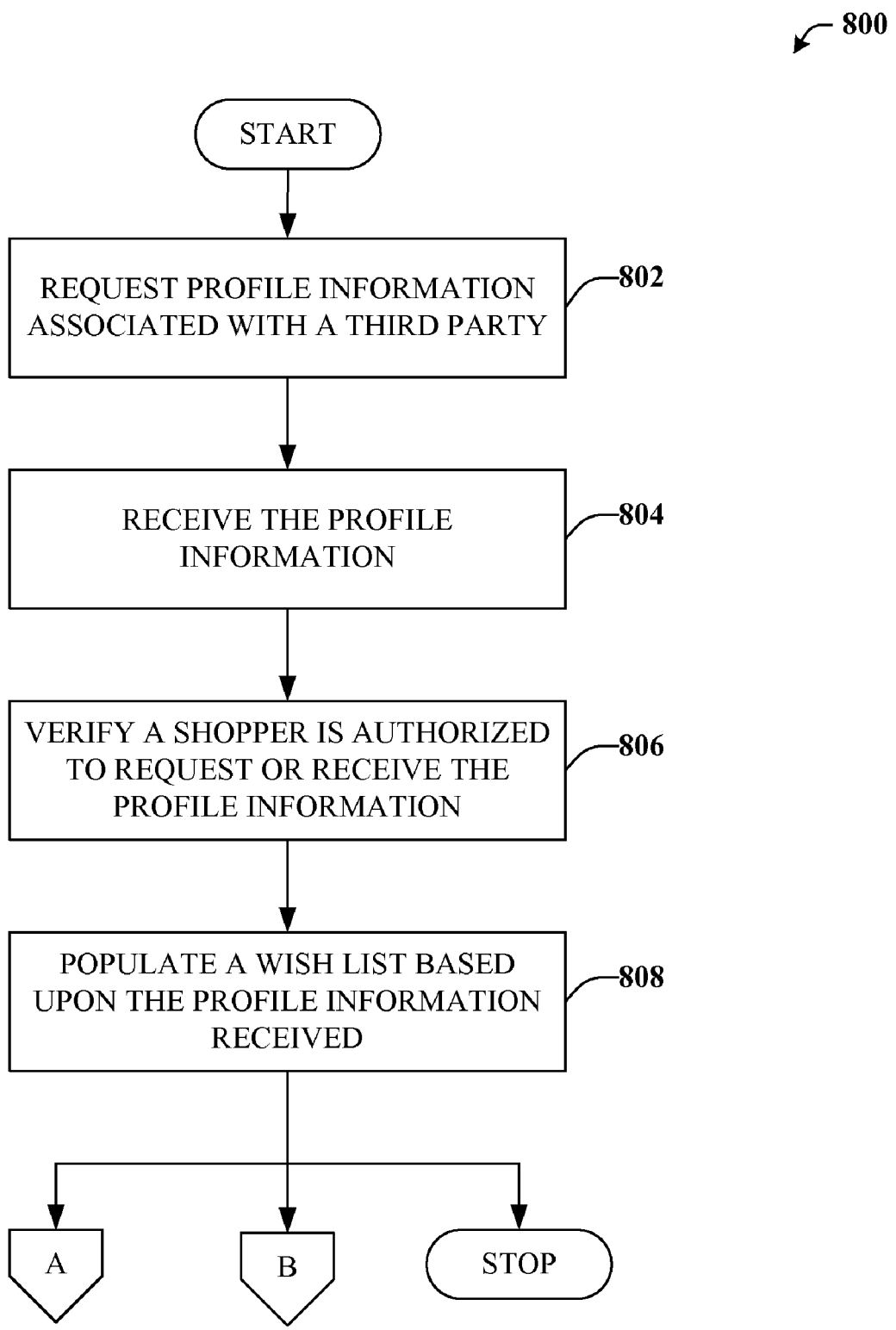
FIG. 8 illustrates an exemplary flow chart of procedures that define a method for accessing information associate with a third party for creating a wish list.

With reference now to FIG. 8, exemplary method 800 for accessing information associate with a third party for creating a wish list is illustrated. Generally at reference numeral 802, profile information associated with a third party can be requested; and at reference numeral 802 said profile information can be received. The profile information can be substantially any information included in a third party profile (e.g., a profile associated with a third party) such as wish or purchase lists, transaction histories, preferences, demographic data and so forth.

At reference numeral 806, a shopper can be verified as to whether or not the shopper is authorized to request or receive the profile information detailed in connection with acts 802 and 804. Accordingly, information can be secured from public access and/or limited only to parties who are authorized by the third party. At reference numeral 808, a wish list can be populated based upon the profile information received at act 804. In particular, a wish list or a purchase or transaction history of a third party can be utilized to populate a wish list for the shopper. Accordingly, the shopper can, inter alia, rely upon likely interests of a third party for purchase or gift ideas, which is further detailed with reference to FIG. 9.

Figure 9:
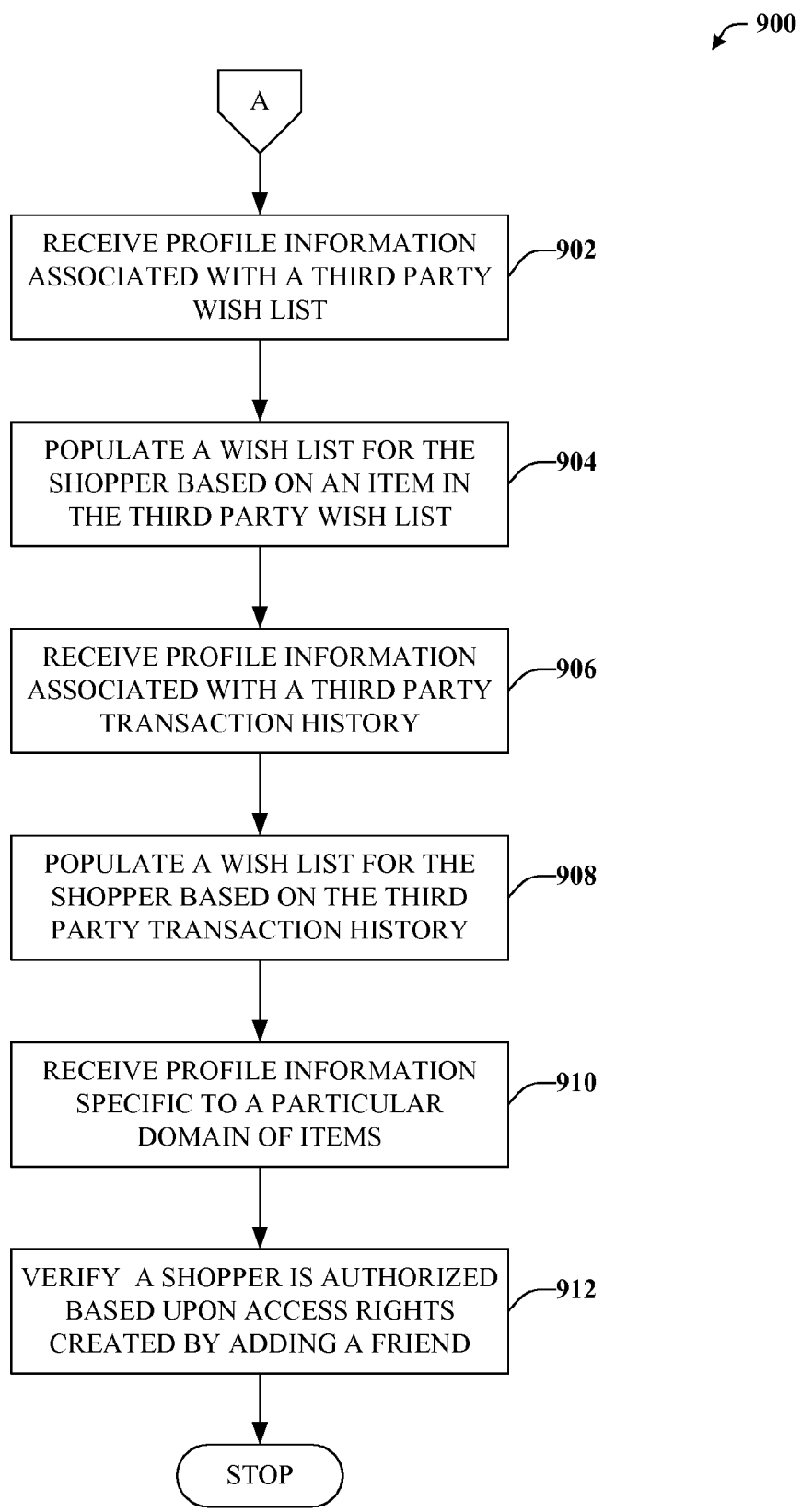
FIG. 9 is an exemplary flow chart of procedures that define a method for facilitating addition features in connection with creating a wish list.

Turning now to FIG. 9, exemplary method 900 for facilitating addition features in connection with creating a wish list is depicted. At reference numeral 902, profile information associated with the third party can be received in the form of a third party wish list. Accordingly, at reference numeral 904, a wish list for the shopper can be populated based upon an item listed in the third party wish list.

At reference numeral 906, profile information associated with the third party can be received in the form of a third party transaction history. Thus, at reference numeral 908, a wish list for the shopper can be populated based upon an item listed in the third party transaction history. Hence, unlike act 904, wherein the third party's wish list is utilized, only actual purchases (possibly verified to some degree) of the third party are utilized to populate the wish list.

Similarly, at reference numeral 910, profile information specific to a particular domain of items can be received. More particularly, the profile information received at acts 804, 902, or 904 can be from or limited to one or more specific domains, such as apparel, music, food, and so on. Accordingly, it is conceivable that shopper can populate a wish list from numerous sources (e.g., third parties), potentially choosing the best aspects from each source relative to the shopper's own likes, interests, tastes, etc.

At reference numeral 912, a shopper can be verified (e.g., authorized to request or receive the profile information associated with the third party) based upon access rights that are created when the third party adds the shopper to a friend list. Accordingly, rather than setting individual preferences, certain rights, credentials, or permissions can be acquired merely by creating an association.

Figure 10:
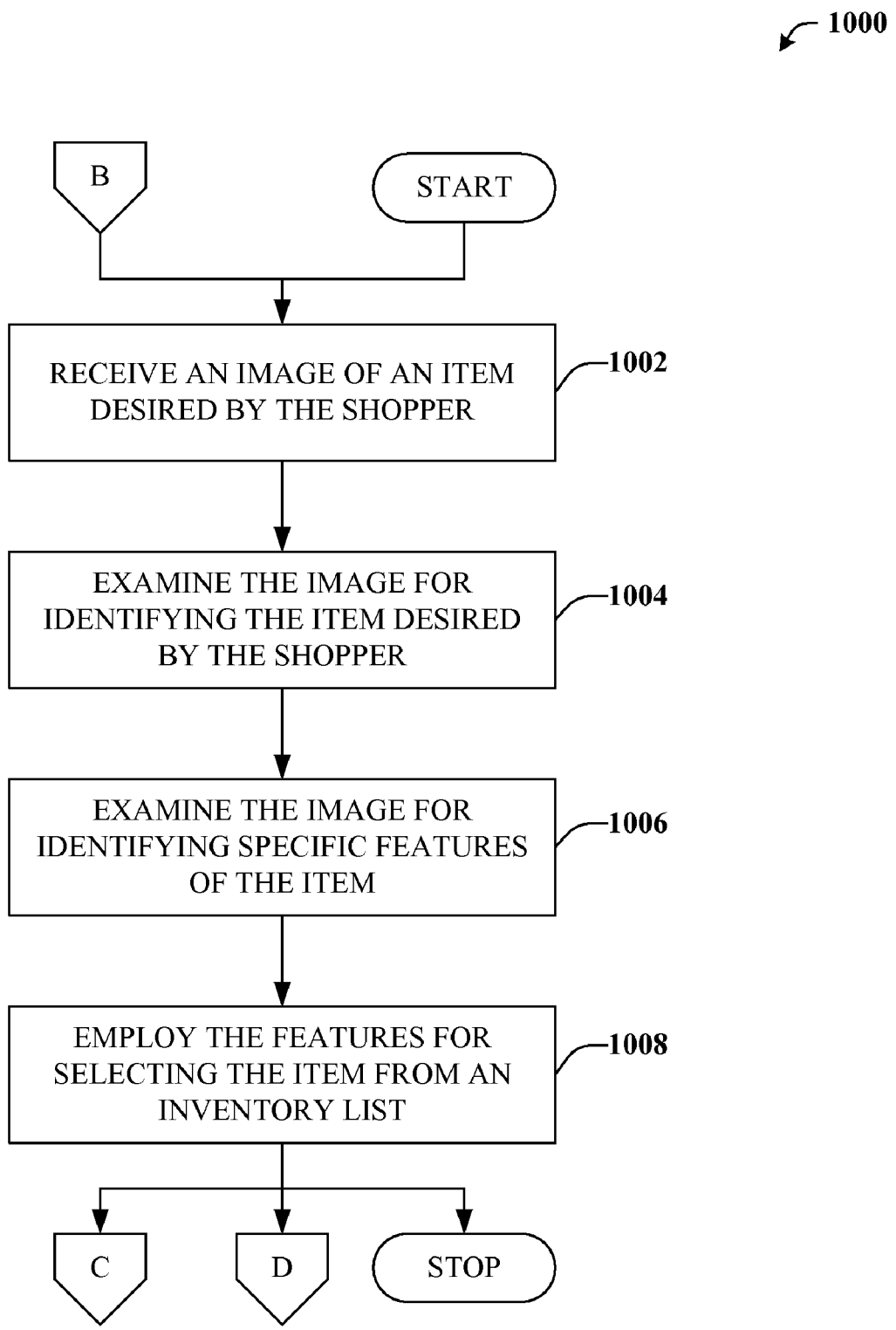
FIG. 10 depicts an exemplary flow chart of procedures defining a method for utilizing images for creating a wish list for a shopper.

With reference now to FIG. 10, method 1000 for utilizing images for creating a wish list for a shopper is illustrated. In general, at reference numeral 1002, an image of an item desired by the shopper can be received. The image can be, e.g., received from a cellular phone or another mobile or portable device, as well as from a media repository and so on. In accordance therewith, the shopper can identify desirable items at substantially any time and/or while engaged in other tasks or productive work, rather than only while actively shopping or browsing a catalog, as well as view the item in a live environment rather than based upon a static model.

At reference numeral 1004, the image can be examined for identifying the item desired by the shopper. In particular, the image can be examined in order to ascertain what object or element of the image represents the item desired by the shopper. It is to be appreciated that the image can include many objects or elements, so identification of the desired item is not always a trivial process. Rather, such identification can rely upon inferences and/or intelligent determinations based upon, e.g., position of objects in the image, other recent images received, range versus zoom metrics, and so on, as well as, potentially other indicia relating to the shopper such as that which can reside in a profile.

At reference numeral 1006, the image can be examined for identifying specific features of the item. Accordingly, once the object or representation within the image is identified, various features such as brand, model, make, style, cut, and so forth can be identified. Thereafter, at reference numeral 1008, those features identified at act 1006 can be employed for selecting the item or a substantially similar item from an inventory list associated with one or more vendors.

Figure 11:
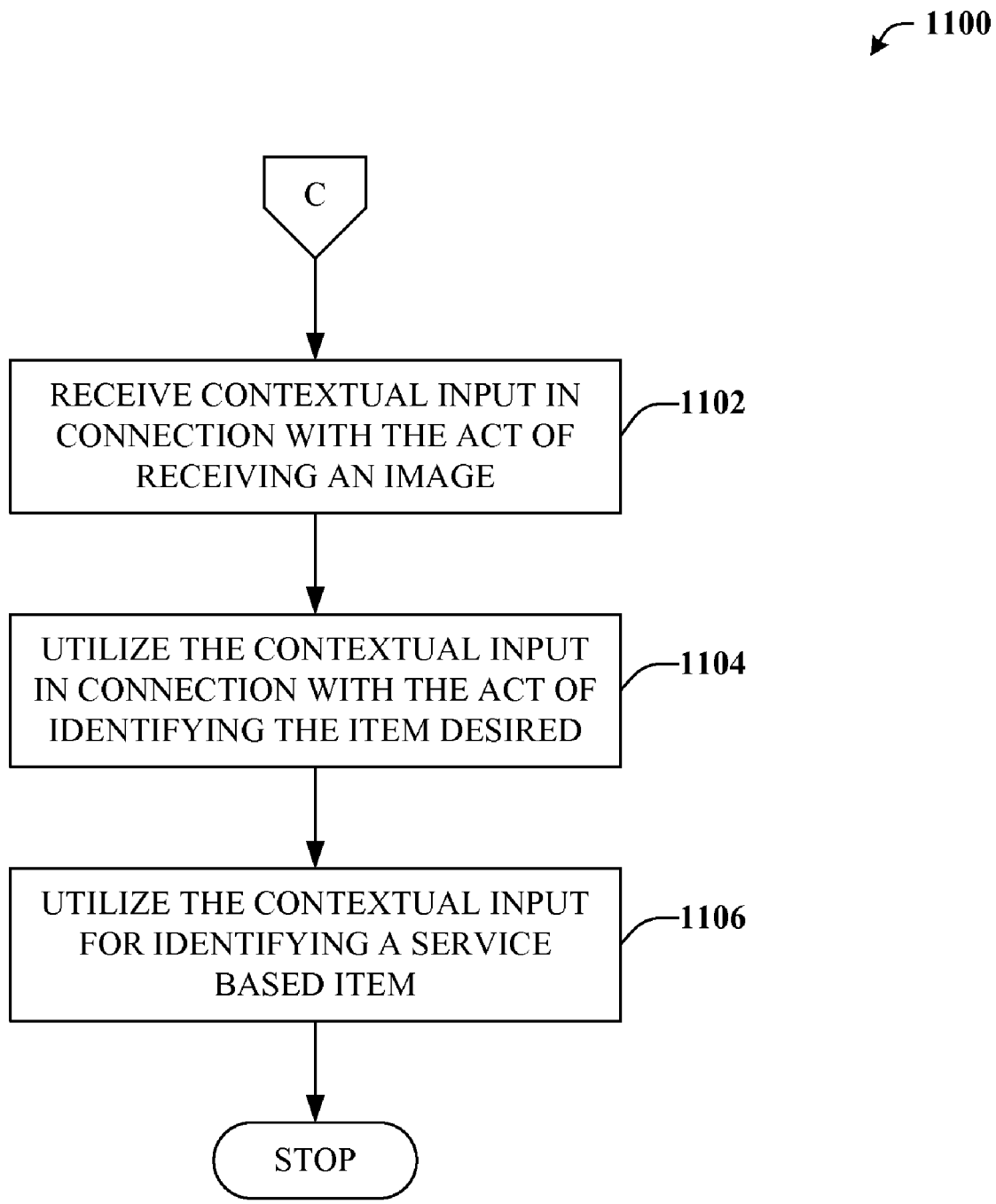
FIG. 11 illustrates an exemplary flow chart of procedures that define a method for utilizing contextual input associated with images for creating a wish list for a shopper.

Referring briefly to FIG. 11, method 1100 for utilizing contextual input associated with images for creating a wish list for a shopper is provided. At reference numeral 1102, contextual input can be received in connection with the act of receiving an image described at act 1002. Contextual input can be, e.g. text-based data input by the shopper along with the image and intended to provide addition context to the image.

At reference numeral 1104, the contextual input can be utilized in connection with the act of identifying the item desired by the shopper detailed at reference numeral 1004. For example, the contextual input can name the item desired or materially narrow the domain of the item. Additionally or alternatively, at reference numeral 1106, the contextual input can be utilized for identifying a service based item given that service-based items might otherwise be more difficult to identify from an image than are product-based items.

Figure 12:
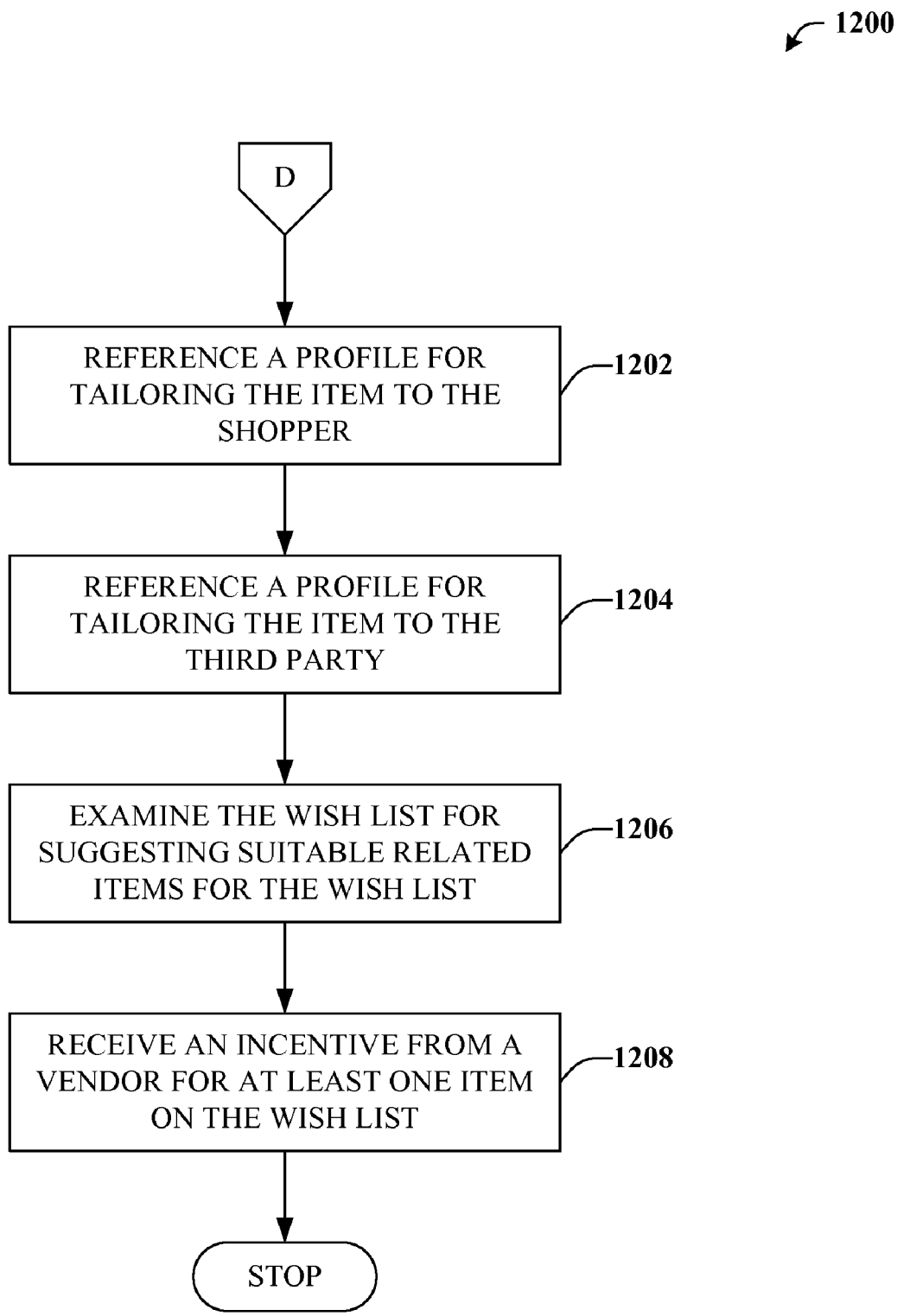
FIG. 12 depicts an exemplary flow chart of procedures defining a method for facilitating additional features in connection with utilizing images for creating a wish list for a shopper.

Turning now to FIG. 12, method 1200 for facilitating additional features in connection with utilizing images for creating a wish list for a shopper is depicted. Generally, at reference numeral 1202, a profile associated with the shopper can be referenced for tailoring the item selected from the inventory list at act 1008 to the shopper. Similarly, at reference numeral 1204, a profile associated with a third party can be referenced for tailoring the item selected from the inventory list at act 1008 to the third party. In accordance therewith, personal features such as size, color, complexion, or the like which are commonly identified at a point-of-sale can be automatically retrieved based upon the intended beneficiary of the wish list. For example, if the shopper intends the item appearing on the wish list for oneself, then the shopper's profile can be accessed to obtain suitable data. Likewise, if the shopper intends the item on the wish list for a third party beneficiary, then the third party's profile can be accessed to obtain suitable data, wherein in the latter case authentication can be initially required.

At reference numeral 1206, the wish list can be examined for suggesting suitable related items for the wish list. In addition, profile information relating to the beneficiary of one or more items on the wish list can also be accessed for determining a suitable suggestion. At reference numeral 1208, an incentive from a vendor can be received for at least one item on the wish list. For example, all or portions of the wish list can be provided to selected vendors to allow such vendors to compete for fulfilling transactions relating to the wish list. The incentives can then be delivered to the shopper, potentially filtered based upon, e.g., price, quality, reputation, similarity to the item imaged at act 1002, and so forth.

Figure 13:
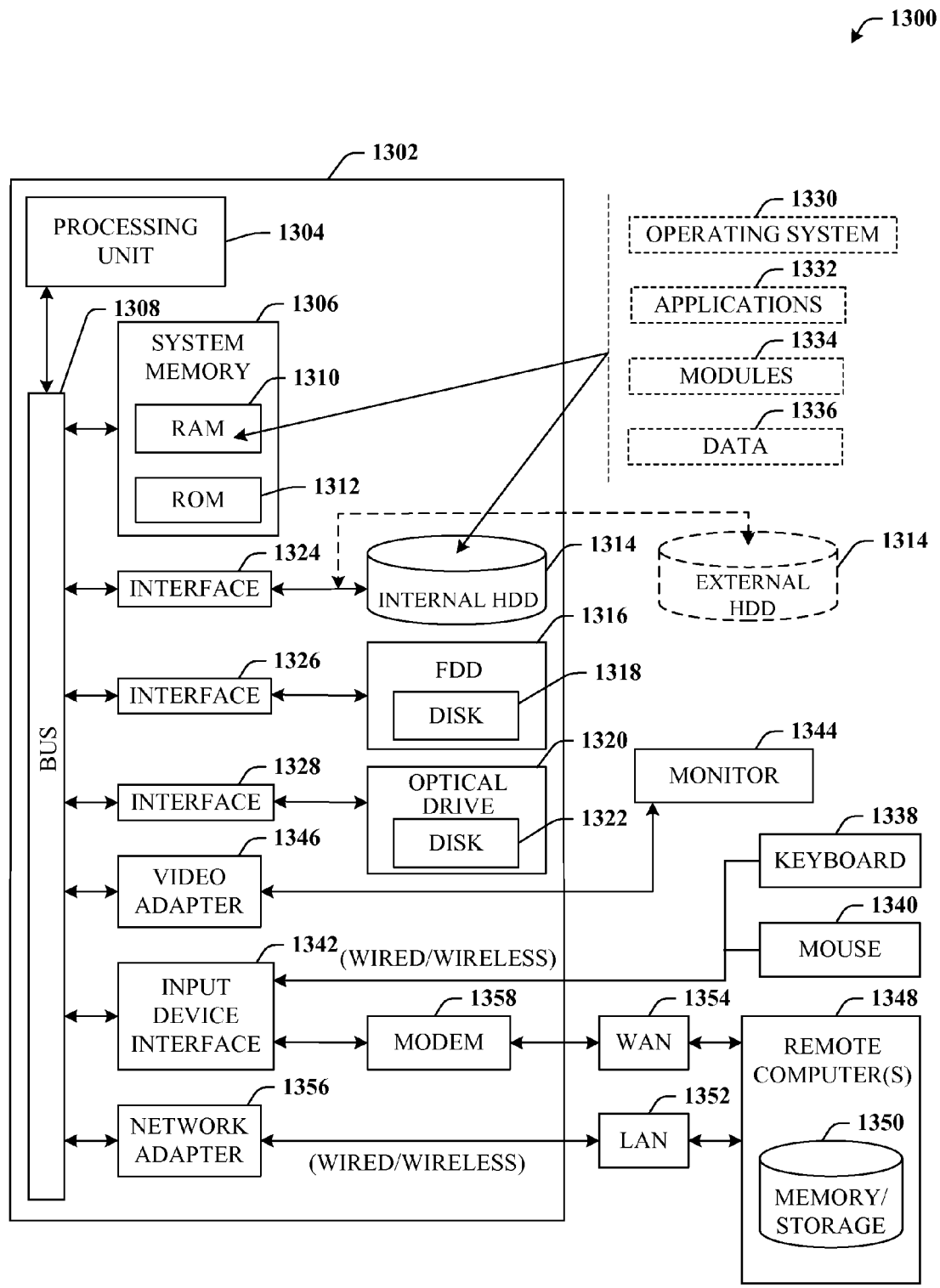
FIG. 13 illustrates a block diagram of a computer operable to execute the disclosed architecture.

Referring now to FIG. 13, there is illustrated a block diagram of an exemplary computer system operable to execute the disclosed architecture. In order to provide additional context for various aspects of the claimed subject matter, FIG. 13 and the following discussion are intended to provide a brief, general description of a suitable computing environment 1300 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the claimed subject matter includes a computer 1302, the computer 1302 including a processing unit 1304, a system memory 1306 and a system bus 1308. The system bus 1308 couples to system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the claimed subject matter can be implemented with various commercially available operating systems or combinations of operating systems.

A user can enter commands and information into the computer 1302 through one or more wired/wireless input devices, e.g. a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g. a wide area network (WAN) 1354. Such LAN and WAN networking environments are commonplace in offices and companies, and facilitate enterprise-wide computer networks, such as intranets, all of which may connect to a global communications network, e.g. the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 13 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 14:
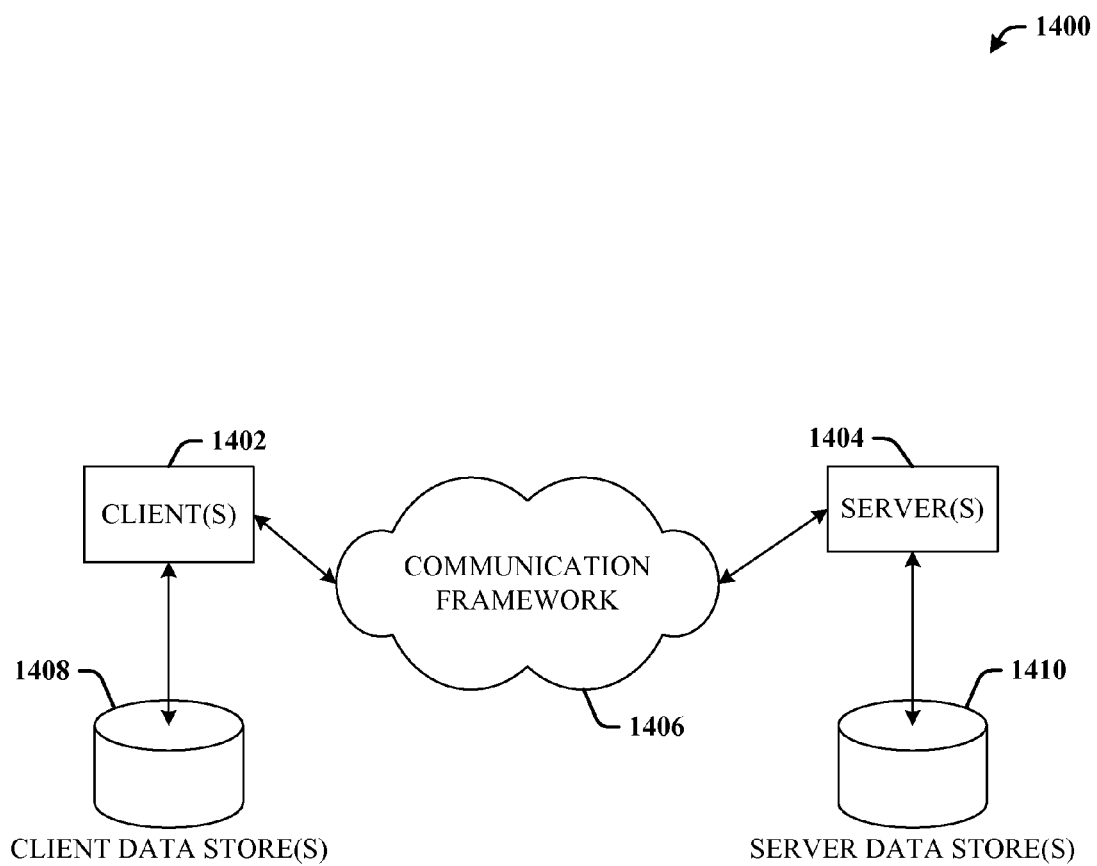
FIG. 14 illustrates a schematic block diagram of an exemplary computing environment.

Referring now to FIG. 14, there is illustrated a schematic block diagram of an exemplary computer compilation system operable to execute the disclosed architecture. The system 1400 includes one or more client(s) 1402. The client(s) 1402 can be hardware and/or software (e.g., threads, processes, computing devices). The client(s) 1402 can house cookie(s) and/or associated contextual information by employing the claimed subject matter, for example.

The system 1400 also includes one or more server(s) 1404. The server(s) 1404 can also be hardware and/or software (e.g., threads, processes, computing devices). The servers 1404 can house threads to perform transformations by employing the claimed subject matter, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system that generates a wish list for a shopper based upon one or more images, the system comprising:
    a computing device having a processor and a memory, the processor configured to execute:
        an interface component that receives an image that includes a representation of an item desired by a shopper and receives contextual input comprising at least a portion of user-generated text, the image being received from an image capture device;
        an entity component that identifies the representation of the item desired by the shopper included in the image based at least in part on the contextual input;
        a feature extraction component that extracts features of the item discernible in the representation in order to match the representation to a catalog item for sale by a vendor, the catalog item comprising a service-based catalog item; and
        a list creation component that populates a wish list with the catalog item and accesses a profile associated with the shopper in order to tailor the catalog item to the shopper.

2. The system of claim 1, wherein the contextual input is utilized to distinguish the representation from one or more other representations included in the image.

3. The system of claim 1, wherein the list creation component accesses a profile associated with a third party beneficiary in order to tailor the catalog item to the third party beneficiary.

4. The system of claim 1, wherein the list creation component examines the wish list and suggests a suitable additional item to add to the wish list.

5. The system of claim 1, wherein the interface component transmits a portion of the wish list to the vendor and receives an incentive from the vendor.

6. A computer-implemented system that accesses information associated with a second shopper to create a wish list for a first shopper, the system comprising:
    a computing device having a processor and a memory, the processor configured to execute:
        a communication component that requests and receives information that relates to a second shopper, the information including one or more of a portion of a second wish list of the second shopper and a portion of a transaction history of the second shopper;
        an authentication component that verifies that a first shopper is authorized to request and receive the information; and
        a list generation component that populates a first wish list for the first shopper with one or more items indicated in the received information, the first wish list for the first shopper including a plurality of items in which the first shopper is interested in purchasing or receiving.

7. The system of claim 6, wherein the list generation component populates the first wish list with an item included in the second wish list.

8. The system of claim 6, wherein the list generation component populates the first wish list with an item previously purchased by the second shopper.

9. The system of claim 6, wherein the information is specific to a particular domain of items.

10. The system of claim 6, wherein the authentication component verifies the first shopper is authorized based upon access rights that are granted when the second shopper adds the first shopper to a friend list.

11. A method implemented by one or more computing devices having a processor and a memory for accessing information associated with a second shopper for creating a wish list, comprising:
    receiving a request from a first shopper to automatically populate a wish list of the first shopper with items in a selected domain that are purchased by a second shopper, the wish list of the first shopper indicating a plurality of items the first shopper is interested in purchasing or receiving;
    requesting profile information associated with the second shopper;
    receiving the profile information that includes a transaction history of the second shopper with respect to the selected domain of items;
    verifying, by a computing device having a processor and a memory, that the first shopper is authorized to request and receive the profile information associated with the second shopper; and
    populating the wish list of the first shopper based upon the profile information received, wherein at least one item that is listed in the second shopper transaction history information is populated in the wish list, the at least one item being in the domain and being previously purchased by the second shopper.

12. The method of claim 11, further comprising at least one of the following acts:
    receiving profile information associated with a second wish list associated with the second shopper;
    populating the wish list for the first shopper based upon an item listed in the second wish list of the second shopper; or
    verifying a shopper is authorized to request or receive the profile information based upon access rights that are created when the second shopper adds the first shopper to a friend list.

13. The method of claim 11, further comprising at least one of the following acts:
    receiving an image of an item desired by the first shopper;
    examining the image to identify the item desired by the first shopper;
    examining the image to identify specific features of the item; or employing the features for selecting the item from an inventory list associated with a vendor.

14. The method of claim 13, further comprising at least one of the following acts:

receiving contextual input in connection with the act of receiving an image;

utilizing the contextual input in connection with the act of identifying the item desired by the first shopper; or utilizing the contextual input for identifying a service-based item.

15. The method of claim 13, further comprising at least one of the following acts:

referencing a profile associated with the first shopper for tailoring the item selected from the inventory list to the first shopper;

referencing a profile associated with the second shopper for tailoring the item selected from the inventory list to the second shopper;

examining the wish list for suggesting suitable related items for the wish list; or receiving an incentive from a vendor for at least one item on the wish list.

* * * * *